(12) United States Patent
  Rieger (10) Patent No.: US 8,365,623 B2
(45) Date of Patent: *Feb. 5, 2013

(54) DOUBLE CLUTCH TRANSMISSION (75) Inventor: Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 394 days.

This patent is subject to a terminal disclaimer.

(21) Appl. No.: 12/681,908

(22) PCT Filed: Oct. 8, 2008

(86) PCT No.: PCT/EP2008/063431
§ 371 (c)(1),
(2), (4) Date: Apr. 7, 2010

(87) PCT Pub. No.: WO2009/050079
PCT Pub. Date: Apr. 23, 2009

(65) Prior Publication Data
US 2010/0282019 A1 Nov. 11, 2010

(30) Foreign Application Priority Data
Oct. 15, 2007 (DE) .......................... 10 2007 049 267

(51) Int. Cl.
*F16H 3/08* (2006.01)
(52) U.S. Cl. ........................................................ 74/330
(58) Field of Classification Search .................... 74/330, 74/333, 340
See application file for complete search history.

(56) References Cited

U.S. PATENT DOCUMENTS
6,244,123 B1  6/2001  Hegerath et al.
6,869,379 B2 *  3/2005  Voss et al. ..................... 475/218
(Continued)

FOREIGN PATENT DOCUMENTS
DE  38 22 330 A1  7/1989
DE  102 39 540 A1  3/2004
(Continued)

OTHER PUBLICATIONS

Prof. Dr. P. Tenberge; "Doppelkupplungsgetriebe in Planetenradbauweise Getriebestrukturen zwischen Automatik-und Doppelkupplungsgetrieben" Wissenportal baumaschine de Mar. 2007.

*Primary Examiner* — Ha D. Ho
(74) *Attorney, Agent, or Firm* — Davis & Bujold, PLLC (57) ABSTRACT

A dual-clutch transmission with two clutches (K1, K2) whose input sides are connected to a drive input shaft (w_an) and whose output sides are respectively connected to one of two transmission input shafts (w_K1, w_K2) arranged coaxially with one another. Idler gearwheels (01, 02, 03, 04, 05, 06) are mounted to rotate on at least two countershafts (w_vorgelege1, w_vorgelege2) while fixed gearwheels (09, 10, 11) are rotationally fixedly connected on the two transmission input shafts (w_K1, w_K2). A plurality of coupling devices (A-B, C, D-E, D, E-F, F) connect the idler gearwheels (01, 02, 03, 04, 05, 06) of the two countershafts (w_vorgelege1, w_vorgelege2) with a respective drive output gearwheel (07, 08) fixed on each of the two countershafts (w_vorgelege1, w_vorgelege2). At least one shifting element (G) couples the two transmission input shafts (w_K1, w_K2) such that at least six shift-under-load forward gears (1, 2, 3, 4, 5, 6) and at least one reverse gear (RA1, R1) can be engaged. The transmission has three wheel planes (01-04; 02-05; 03-06) or four wheel planes (01-04, 01-09; 02-05, 02-04; 03-11, 03-05; 12-06) arranged in such manner that at least one shift-under-load winding gear can be engaged by the shifting element (G).

49 Claims, 3 Drawing Sheets

U.S. PATENT DOCUMENTS

| | | | |
|---|---|---|---|
| 7,066,043 B2 * | 6/2006 | Kim et al. | 74/330 |
| 7,225,696 B2 * | 6/2007 | Gitt | 74/340 |
| 7,246,536 B2 | 7/2007 | Baldwin | |
| 7,287,442 B2 | 10/2007 | Gumpoltsberger | |
| 7,597,644 B2 * | 10/2009 | Rodgers, II | 475/218 |
| 7,604,561 B2 * | 10/2009 | Earhart | 475/218 |
| 7,604,565 B2 * | 10/2009 | Lee et al. | 477/3 |
| 8,051,732 B2 * | 11/2011 | Gitt | 74/331 |
| 2006/0054441 A1 | 3/2006 | Ruedle | |
| 2009/0036247 A1 * | 2/2009 | Earhart et al. | 475/35 |

FOREIGN PATENT DOCUMENTS

| | | |
|---|---|---|
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

DOUBLE CLUTCH TRANSMISSION

This application is a National Stage completion of PCT/EP2008/063431 filed Oct. 8, 2008, which claims priority from German patent application serial no. 10 2007 049 267.9 filed Oct. 15, 2007.

FIELD OF THE INVENTION

The present invention concerns a dual-clutch transmission for a vehicle.

BACKGROUND OF THE INVENTION

From the document DE 103 05 241 A1, a six-gear or seven-gear dual-clutch transmission is known. The dual-clutch transmission has two clutches, each connected on its input side to the drive input shaft and, on its output side, to one of the two respective transmission input shafts. The two transmission input shafts are arranged coaxially with one another. Further, two countershafts are arranged axis-parallel to the two transmission input shafts, whose idler gearwheels mesh with fixed gearwheels of the transmission input shafts. Moreover, coupling devices are held rotationally fixed but able to move axially, on the countershafts, in order to be able to shift the respective gearwheels of the gears. The transmission ratio in each case is transmitted by the drive output gearwheels to a differential gearbox. To produce the desired transmission ratio steps with the known dual-clutch transmissions, a substantial number of wheel planes are required, so that the structural space required for installing them is not inconsiderable.

Further, from the document DE 38 22 330 A1 a spur gear variable-speed transmission is known. The spur gear variable-speed transmission comprises a dual clutch that can be shifted under load, one part of which is connected to a drive input shaft and whose other part is connected with a hollow drive input shaft mounted to rotate on the drive input shaft. For certain transmission ratios, the drive input shaft can be coupled to the hollow drive input shaft by means of a shifting element.

From the document DE 10 2004 001 961 A1 a shift-under-load transmission with two clutches is known, each of which is associated with a part-transmission. The transmission input shafts of the two part-transmissions are arranged coaxially with one another and are engaged, via fixed gearwheels, with idler gearwheels of the associated countershafts. The respective idler gearwheels of the countershafts can be connected rotationally fixed to their countershafts by means of associated shifting elements. From that document, a six-gear transmission is known in which a further shifting element is provided for coupling the two transmission input shafts in order to create a further transmission ratio step. In this design version, the six-gear transmission requires at least five wheel planes in the two part-transmissions in order to be able to produce the transmission ratio steps. This results in an undesired increase of the structural length, in the axial direction, which considerably restricts the possibility of installation in a vehicle.

SUMMARY OF THE INVENTION

The purpose of the present invention is to propose a dual-clutch transmission of the type described at the start with which, on the one hand, the shift-under-load transmission ratio steps can be produced with the least possible need for structural space and, on the other hand, such that the transmission contains as few components as possible in order to keep the production costs of the transmission low.

Thus, a dual-clutch transmission with only three or four wheel planes in the part-transmissions is produced such that, to enable winding gears, the two part-transmissions can be coupled by means of the at least one additional shifting element. In this way, a maximum number of transmission ratios can be produced in the proposed dual-clutch transmission with the fewest possible wheel planes, preferably such that all the forward gears and the reverse gears can be shifted under load in sequence.

In the case of winding gears, gearwheels of gears in the two part-transmissions are coupled with one another in order to produce a force flow through both part-transmissions. The shifting element used, in each such case, serves to couple together two idler gearwheels and thereby brings the transmission input shafts into relationship with one another. Regardless of the embodiment variant of the dual-clutch transmission concerned, the arrangement of the shifting element for coupling two particular idler gearwheels can be varied so the shifting element does not necessarily have to be arranged between the idler gearwheels to be coupled.

Thanks to the small number of wheel planes required, the axial length of the proposed transmission is short, whereby even front transverse mounting in vehicles is made possible. Since the dual-clutch transmission, according to the invention, also contains winding gears and by virtue of its three-shaft configuration, multiple uses of individual wheel pairs or wheels are enabled, which leads to a saving of components in the transmission.

In the dual-clutch transmission according to the invention so-termed dual wheel planes and/or single wheel planes can be provided. In a dual wheel plane, a respective idler gearwheel of each of the countershafts is associated with a fixed gearwheel of one of the transmission input shafts. In contrast, in a single wheel plane only one idler gearwheel of one countershaft is associated with a fixed gearwheel of one of the transmission input shafts. Since in each dual wheel plane at least one idler gearwheel can be used for at least two gears, owing to this possible multiple use of idler gearwheels a given number of transmission ratios can be produced with fewer wheel planes. Thus, the structural length of the transmission is reduced.

Thanks to the use of single wheel planes in which only one idler gearwheel of one countershaft is associated with the fixed gearwheel of the associated transmission input shaft, there is a free choice of transmission ratio. It is also possible for a dual wheel plane to be replaced by two single wheel planes, and vice-versa.

The winding gears can be produced by means of a plurality of wheel pairs or wheel planes so that other gears can be shifted by means of the individual wheel pairs or wheel planes of the winding gears. In addition, the proposed transmission has a large degree of freedom in relation to the transmission spread and the transmission steps that can be realized.

The proposed wheel planes provide a gearset arrangement in the dual-clutch transmission, according to the invention, with at least six forward transmission ratios and a number of reverse transmission ratios, such that at least one winding gear can be realized in the first gear step and in one of the reverse gears. In addition, further winding gears can be engaged as the second to the sixth gear or even as a reverse gear, such that at least the sixth gear can be shifted under load as a function of the fifth gear. In a sequential design, all the forward gears and reverse gears should be able to shift under load. Winding gears that cannot be shifted under load can be provided as intermediate gears whose transmission ratio is, in each case, between the transmission ratios of two main driving gears, as overdrives or overspeed gears in which the transmission ratio is, in each case, smaller than the lowest transmission ratio of the main driving gear (6th gear), as off-road gears or as crawling gears in which the transmission ratio is, in each case, larger than the transmission ratio of the first gears, and/or as further reverse gears.

In the dual-clutch transmission, according to the invention, the load-shiftable reverse gears are produced by only one additional meshing engagement or only one additional gearwheel such that, at least by virtue of the additional rotation direction reversing gearwheel step, a reverse gear can be produced as a winding gear and another reverse gear can be produced directly by the said gearwheel step. The transmission ratios of the reverse gears can be varied, for example, by means of an additional step wheel or the like.

A possible embodiment variant of the present invention can provide that the three wheel planes are produced, for example, by a maximum of three fixed gearwheels of the transmission input shafts which, for example, are engaged with three respective idler gearwheels of the associated countershafts. For example, one fixed gearwheel can be arranged on the first transmission input shaft and two fixed gearwheels on the second transmission input shaft. Other designs too are conceivable for realizing the said three wheel planes.

Thus, in this embodiment variant of the dual-clutch transmission according to the invention, there are six load-shifting forward gears and one, or alternatively, two reverse gears with at least the first gear in the form of a winding gear and, in addition, a first reverse gear formed as a winding gear. The additional shifting element that produces the winding gears is arranged, in this embodiment variant, on the second countershaft between the second and third wheel planes. The first reverse gear can be produced as a winding gear by means of the same clutch as the first gear. The second reverse gear can be load-shifted and is located on the respective other clutch.

A further possible embodiment variant of the present invention can provide that at least one additional fixed gearwheel is arranged, for example, on the first transmission input shaft to form a fourth wheel plane. In this way, in this embodiment variant two fixed gearwheels are provided, respectively, on the transmission input shafts. Other designs too are conceivable for producing a fourth wheel plane in the dual-clutch transmission according to the invention.

In this embodiment variant the additional shifting element, that produces the winding gears, is arranged on the first countershaft between the second and third wheel planes. In this way, the first forward gear and the first reverse gear here too are engaged as winding gears.

In a related embodiment variant of the present invention, again four wheel planes are provided in the part-transmissions. In common with the embodiment variant described above, two respective fixed gearwheels are arranged on the transmission input shafts. The additional shifting element, however, is provided on the second countershaft between the second and third wheel planes. Other possible arrangements are also conceivable and further shifting elements can be used. In this version, besides the first gear the second reverse gear as well is a winding gear.

To be able to produce the desired transmission steps, it can be provided in the dual-clutch transmission, according to the invention, there is arranged on each countershaft of the part-transmissions at least one coupling device with a two-sided action or the like. Depending on their actuation direction, the coupling devices provided can, in each case, connect an associated idler gearwheel rotationally fixed to the countershaft. In addition, a coupling device with a one-side action or the like can be arranged on at least one of the countershafts. As coupling devices, for example hydraulically actuated clutches or else interlock-type claw clutches and any type of synchronizers can be used, which serve to connect an idler gearwheel rotationally fixed to a countershaft. A coupling device with two-sided action can be replaced by two coupling devices with one-side action, and vice-versa.

It is conceivable for the possible arrangements indicated to be varied and also the number of gear gearwheels and the number of coupling devices to be changed, in order to realize still more load-shifting or non load-shifting gears in a manner that saves both structural space and components in the proposed dual-clutch transmission. In addition, the respective arrangement positions of the coupling devices on the wheel planes can be varied. Furthermore, the action direction of the coupling devices can be changed or extended.

Regardless of the respective embodiment variant of the dual-clutch transmission, the drive input shaft and the drive output shaft preferably can not be arranged coaxially with one another, whereby a particularly space-saving arrangement is produced. For example, the shafts accordingly spatially arranged one behind the other can also be slightly offset relative to one another. With this arrangement, a direct gear with a transmission ratio equal to one can be realized by meshing, and can advantageously be positioned relatively freely on the fourth, fifth or sixth gear. Other possible arrangements of the drive input and drive output shafts are also conceivable.

Preferably, the proposed dual-clutch transmission is equipped with an integrated drive output stage. As the drive output gear, the output stage can comprise a fixed gearwheel on the output shaft which meshes both with a fixed gearwheel of the first countershaft and with a fixed gearwheel of the second countershaft.

Advantageously, the lower forward gears and the reverse gears can be actuated by a starting or a shifting clutch so as to concentrate higher loads on the said clutch, thereby allowing the second clutch to be made more compactly and inexpensively. In particular, the wheel planes in the proposed dual-clutch transmission can be so arranged that starting can be carried out both via the inner transmission input shaft or via the outer transmission input shaft and thus by means of whichever clutch is best suited, which is also possible with a concentrically arranged, radially nested configuration of the dual clutch one inside the other. For that purpose, the wheel planes can be arranged correspondingly mirror-symmetrically or exchanged. It is also possible for the countershafts to be arranged the other way round or mirror-symmetrically.

BRIEF DESCRIPTION OF THE DRAWINGS

The invention is explained below in greater detail with reference to the drawing, which shows:

FIG. 1: Diagrammatic view of a first embodiment of a six-gear dual-clutch transmission, while FIG. 1A is an example shifting scheme;

FIG. 2: Diagrammatic view of a second embodiment variant of the six-gear dual-clutch transmission according to the invention, while FIG. 2A is an example shifting scheme; and FIG. 3: Diagrammatic view of a third embodiment variant of the six-gear dual-clutch transmission according to the invention, while FIG. 3A is an example shifting scheme

DETAILED DESCRIPTION OF THE PREFERRED EMBODIMENTS

Figure 1:
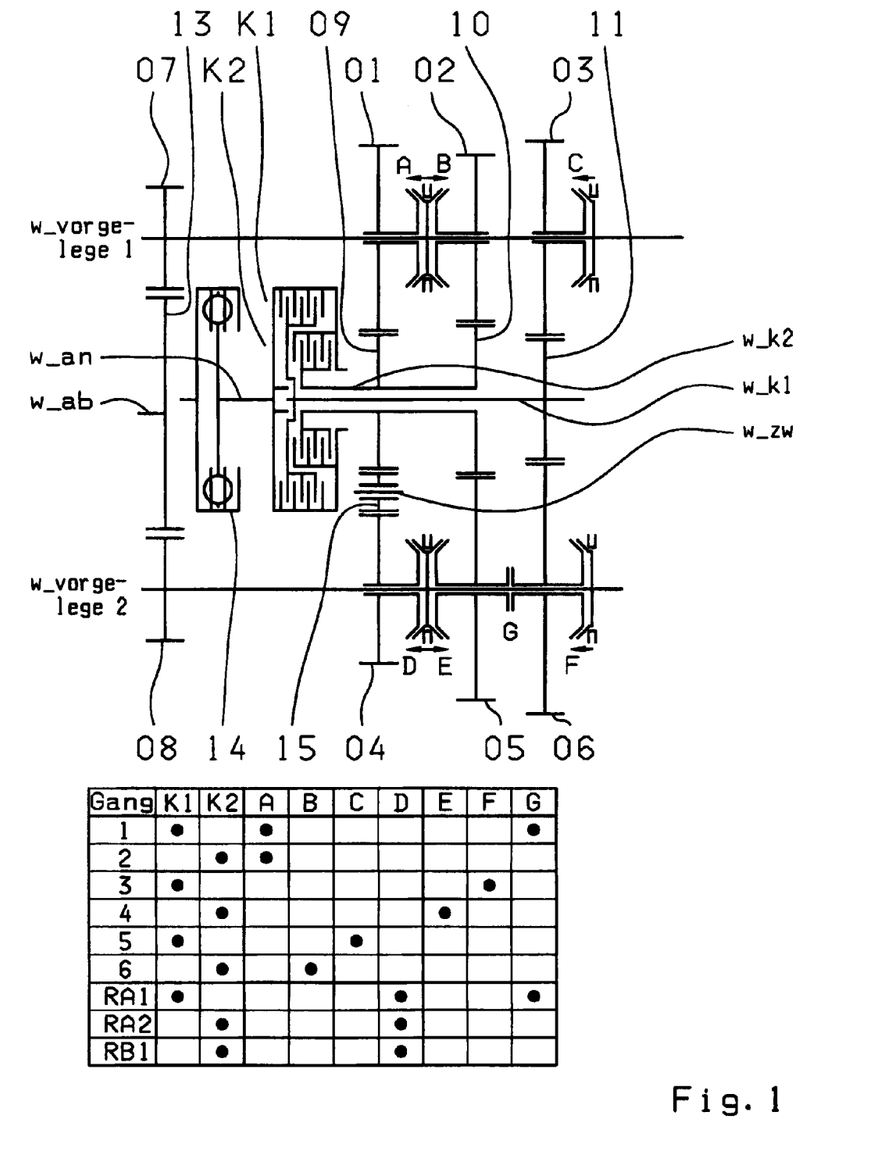

A six-gear dual-clutch transmission, according to the invention, comprises two clutches K1, K2 whose input sides are connected to a drive input shaft w_an. In addition, a torsional vibration damper 14 can be arranged on the driveshaft w_an. The output sides of the clutches K1, K2 are respectively connected to one of two transmission input shafts w_K1, w_K2 arranged coaxially with one another. The first transmission input shaft w_K1 is a solid shaft and the second transmission input shaft w_K2 is a hollow shaft. The two transmission input shafts w_K1 and w_K2 are coupled by a shifting element G with meshing teeth, so that the transmission input shafts w_K1 and w_K2 are brought into relationship. Furthermore, two countershafts w_vorgelege1, w_vorgelege2 are provided, which are arranged axis-parallel to one another. Regardless of the respective embodiment variant, each countershaft w_vorgelege1, w_vorgelege2 has gear gearwheels in the form of idler gearwheels 01, 02, 03, 04, 05, 06 which are mounted to rotate on the countershafts w_vorgelege1, w_vorgelege2.

In the first embodiment, variant fixed gearwheels 09, 10 are arranged rotationally fixed on the second transmission input shaft w_K2 and a fixed gearwheel 11 is so arranged on the first transmission input shaft w_K1. In this way, three wheel planes 01-04, 02-05, 03-06 are formed as dual wheel planes.

In the first wheel plane 01-04, the fixed gearwheel 09 of the second transmission input shaft w_K2 meshes with the idler gearwheel 01 of the first countershaft w_vorgelege1. Furthermore, an idler gearwheel 15 on an intermediate shaft w_zw meshes with both the fixed gearwheel 09 of the second transmission input shaft w_K2 and with the idler gearwheel 04 of the second countershaft w_vorgelege2. In this way, a rotation direction reversal can be provided in order to produce reverse gears RA1, RA2 and RB1. It is also possible for the idler gearwheel 15 to be made as a step wheel. For the rotation direction reversal, the idler gearwheel 01 of the first countershaft w_vorgelege1 can also mesh with the idler gearwheel 04 of the second countershaft w_vorgelege2 and, in that case, the idler gearwheel 15 can be omitted.

In the second wheel plane 02-05 the fixed gearwheel 10 of the second transmission input shaft w_K2 engages both with the idler gearwheel 02 of the first countershaft w_vorgelege1 and also with the idler gearwheel 05 of the second countershaft w_vorgelege2. Finally, in the third wheel plane 03-06, the fixed gearwheel 11 meshes both the idler gearwheel 03 of the first countershaft w_vorgelege1 and also with the idler gearwheel 06 of the second countershaft w_vorgelege2.

Furthermore, in the first embodiment variant of the present invention, there are arranged on the first countershaft w_vorgelege1 and on the second countershaft w_vorgelege2, between the first wheel plane 01-04 and the second wheel plane 02-05, a respective two-sided action coupling device A-B and D-E in each case. In addition, a coupling device C, with one-sided action, is provided on the first countershaft w_vorgelege1 on the side of the third wheel plane 03-06 facing away from the clutches K1, K2. Similarly, a coupling device F, with one-sided action, is also arranged on the second countershaft w_vorgelege2 on the side of the third wheel plane 03-06 facing away from the clutches K1, K2.

In this embodiment variant, the additional shifting element G, for producing the winding gears or coupling of the two part-transmissions, is arranged on the second countershaft w_vorgelege2, between the second wheel plane 02-05 and the third wheel plane.

To transmit the transmission selected ratio, in each case, to the drive output shaft w_ab, in the dual-clutch transmission, according to the invention, an integrated output stage is provided, with a fixed gearwheel 07, on the first countershaft w_vorgelege1, and a fixed gearwheel 08, on the second countershaft w_vorgelege2, each of which meshes with a fixed gearwheel 13 on the output shaft w_ab.

The table in FIG. 1A shows an example shifting scheme for the six-gear dual-clutch transmission.

The shifting scheme shows that the first forward gear 1 can be engaged as a winding gear by means of the first clutch K1, the activated shifting element G, and the coupling device A-B when pushed in the A direction. The second forward gear 2 can be engaged by means of the second clutch K2 and the coupling device A-B, when pushed in the A direction, and the third forward gear 3 again by means of the first clutch K1 and the coupling device F of the second countershaft w_vorgelege2. The fourth forward gear 4 can be engaged by means of the second clutch K2 and the coupling device D-E when pushed in the E direction. The fifth forward gear 5 is engaged by means of the first clutch K1 and the coupling device C of the first countershaft w_vorgelege1. Finally, the sixth forward gear 6 is engaged by means of the second clutch K2 and the coupling device A-B when pushed in the B direction.

In this embodiment variant of the invention, one or alternatively two reverse transmission ratios RA1, RA2 or RB1 are produced, the first reverse gear RA1 being engaged as a winding gear using the same clutch K1 as the first gear 1. The second reverse gear RA2 is engaged with shifting under load using the corresponding other clutch K2, or alternatively, a first reverse gear RB1 is engaged using the clutch K1. Accordingly, the first reverse gear RA1 can be engaged as a winding gear by means of the first clutch K1, the coupling device D-E when pushed in the D direction, and the activated shifting element G. The second reverse gear RA2 or the alternative first reverse gear RA1 are engaged by means of the second clutch K2 and the coupling device D-E pushed in the D direction.

From this shifting scheme it can be seen that in the first forward gear 1 both part-transmissions are in use. In detail, starting from the first clutch K1, the gearwheels 11, 06, 05, 10, 09, 01 and 07 are used. In the second gear only one wheel plane with the gearwheels 09, 01 and 07 is used. In the third gear 3, the gearwheels 11, 06 and 08 are used. In the transmission ratio of the fourth gear, the gearwheels 10, 05 and 08 are used. The fifth gear uses the gearwheels 11, 03 and 07, and the sixth gear 6 uses the gearwheels 10, 02 and 07. In the first reverse gear RA1 that can be engaged as a winding gear, the gearwheels 11, 06, 05, 10, 09, 15, 04 and 08 are used. In the second reverse gear RA2 and the alternative first reverse gear RB1, the gearwheels 09, 15, 04 and 08 are used, respectively.

With this embodiment variant, however, other allocations of the individual gear steps in relation to the clutches are also possible. In particular, for example, a converse allocation can be produced in the simplest manner by mirror-imaging.

Figure 2:
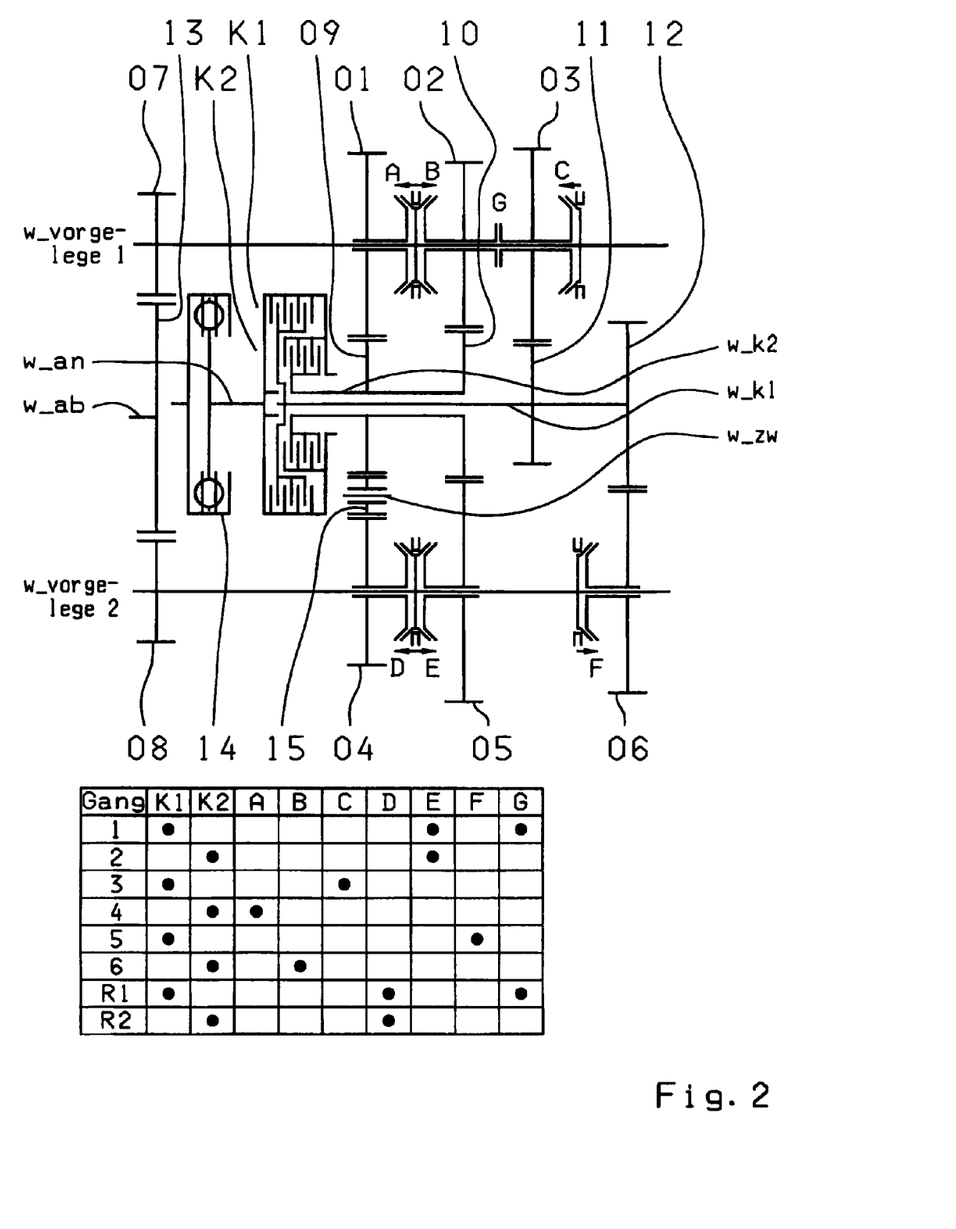

In the second embodiment variant shown in FIG. 2, the same components are referenced in the same way as in FIG. 1. In contrast to the first embodiment variant, in this second embodiment variant an additional fixed gearwheel 12 is provided on the first transmission input shaft w_K1. In this way, a fourth wheel plane 12-06 is formed. The first two wheel planes 01-04, 02-05, with the two-sided action coupling devices A-B, D-E between, them are provided in the second embodiment variant as well and will not, therefore, be described further.

In the second embodiment variant, the third wheel plane 03-11 is created by the fixed gearwheel 11 of the first transmission input shaft w_K1, which meshes with the idler gearwheel 03 of the first countershaft w_vorgelege1. The fourth wheel plane 12-06 is created by the fixed gearwheel 12 of the first transmission input shaft w_K1, which meshes with the idler gearwheel 06 of the second countershaft w_vorgelege2. Thus, in the third wheel plane 03-11 and the fourth wheel plane 12-06, the fixed gearwheels 11 and 12 of the first transmission input shaft w_K1 mesh, in each case, with only one idler gearwheel 03 or 06, respectively. This gives the advantage of a freer choice of transmission ratio, in contrast to wheel planes in which the idler gearwheels engage with the fixed gearwheel on both sides.

Accordingly, in the second embodiment variant shown in FIG. 2, the first and second wheel planes 01-04 and 02-05 are dual wheel planes. In contrast, the third and fourth wheel planes 03-11 and 12-06 are single wheel planes.

Furthermore a one-sided action coupling device C is provided on the first countershaft w_vorgelege1, on the side of the third wheel plane 03-11 facing away from the clutches K1 and K2. A one-sided action coupling device F is provided on the second countershaft w_vorgelege2, on the side of the fourth wheel plane 12-06 facing toward the clutches K1 and K2.

In this second embodiment variant, the additional shifting element G for coupling the two part-transmissions is arranged on the first countershaft w_vorgelege1, between the second wheel plane 02-05 and the third wheel plane 03-11. The table in FIG. 2A shows an example shifting scheme for this embodiment variant.

According to this, the forward gear 1 is engaged as a winding gear by means of the first clutch K1, the activated shifting element G, and the coupling device D-E when pushed in the E direction. The second forward gear 2 is engaged by means of the second clutch K2 and the coupling device D-E when pushed in the E direction. In contrast, the third forward gear 3 is engaged by means of the first clutch K1 and the coupling device C of the first countershaft w_vorgelege1, and the fourth forward gear 4 by the second clutch K2 and the coupling device A-B when pushed in the A direction. Finally, the fifth forward gear 5 is engaged by means of the first clutch K1 and the coupling device F of the second countershaft w_vorgelege2, whereas the sixth forward gear 6 is engaged by the second clutch K2 and the coupling device A-B pushed in the B direction. The first reverse gear R1 is engaged as a winding gear by means of the first clutch K1, the activated shifting element G, and the coupling device D-E pushed in the D direction. On the other hand, the second reverse gear R2 is engaged using the second clutch K2 and by pushing the coupling device D-E in the D direction.

Thus, in the first forward gear 1 the two part-transmissions with the gearwheels 11, 03, 02, 10, 05 and 06 are coupled. In the second forward gear 2 the gearwheels 10, 05 and 08 are used. In the third forward gear, the gearwheels 11, 03 and 07 are used, and in the fourth forward gear 4 the gearwheels 09, 01 and 07 are used. Finally, in the fifth forward gear 5 the gearwheels 12, 06 and 08, and in the sixth forward gear 6 the gearwheels 10, 02 and 07 are used. In the first reverse gear R1, all the wheel planes are used, namely, the gearwheels 11, 03, 02, 10, 09, 15, 04 and 08. In the second reverse gear R2, the gearwheels 09, 15, 06 and 08 are used.

In this embodiment variant, however, other allocations of the individual gear steps in relation to the clutches are also possible. In particular, for example, a converse allocation can be produced by mirror-imaging in the most simple manner.

Figure 3:
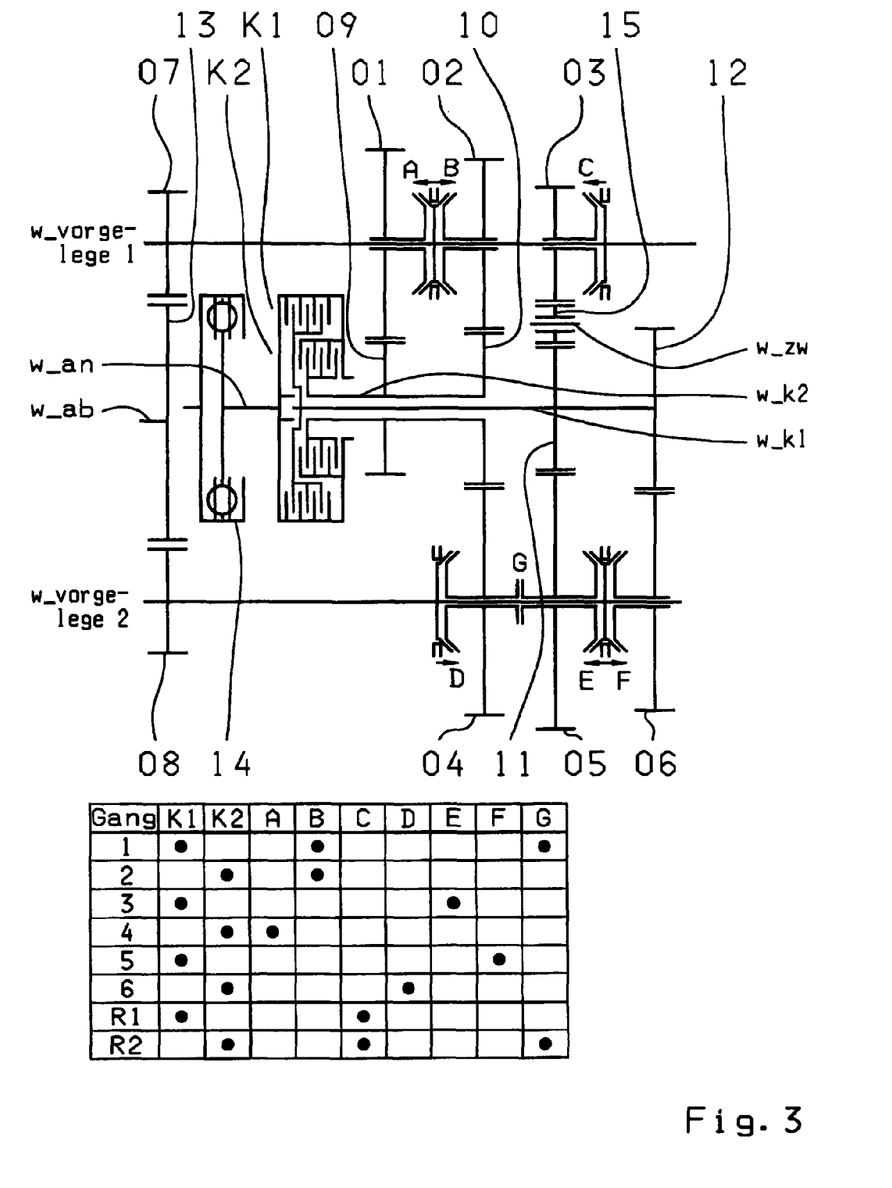

The third embodiment variant is represented in FIG. 3. This third embodiment variant also comprises a further fixed gearwheel 12 on the first transmission input shaft w_K1 so that, in this case, two four wheel planes are formed such that the first wheel plane 01-09 and the fourth wheel plane 12-06 are each dual wheel planes and the second wheel plane 02-04 and the third wheel plane 03-05 are each single wheel planes.

The first wheel plane 01-09 is formed by the fixed gearwheel 09 of the second transmission input shaft w_K2 which meshes with the idler gearwheel 01 of the first countershaft w_vorgelege1. The second wheel plane 02-04 is formed by the fixed gearwheel 10 of the second transmission input shaft w_K2 which meshes both with the idler gearwheel 02 of the first countershaft w_vorgelege1 and also with the idler gearwheel 04 of the second countershaft w_vorgelege2.

The third wheel plane 03-05 is formed by the fixed gearwheel 11 of the first transmission input shaft w_K1 which meshes with the idler gearwheel 05 of the second countershaft w_vorgelege2. In addition, the idler gearwheel 15 on the intermediate shaft w_zw meshes both with the fixed gearwheel 11 of the first transmission input shaft w_K1 and also with the idler gearwheel 03 of the first countershaft w_vorgelege1. In this way, a rotation direction reversal for producing the reverse gears R1 and R2 can be provided. It is also possible for the idler gearwheel 15 to be made as a step wheel. To produce the rotation direction reversal, the idler gearwheel 05 of the second countershaft w_vorgelege2 can also mesh with the idler gearwheel 03 of the first countershaft w_vorgelege1 and, in that case, the idler gearwheel 15 can be omitted.

In this embodiment variant, the fourth wheel plane 12-06 is formed by the fixed gearwheel 12 of the first transmission input shaft w_K1, which meshes with the idler gearwheel 06 of the second countershaft w_vorgelege2.

Thus, in the first wheel plane 01-09 and the fourth wheel plane 12-06, the respective fixed gearwheels 09 and 12 of the first transmission input shaft w_K1 mesh, in each case, with only one idler gearwheel 01 or 06. This gives the advantage of a freer choice of transmission ratio in contrast to wheel planes with idler gearwheels that engage with the fixed gearwheel on both sides.

On the first countershaft w_vorgelege1, a two-sided action coupling device A-B is provided between the first wheel plane 01-09 and the second wheel plane 02-04. Another two-sided action coupling device E-F is arranged on the second countershaft w_vorgelege2 between the third wheel plane 03-05 and the fourth wheel plane 12-06. A one-sided action coupling device D is provided on the second countershaft w_vorgelege2, on the side of the second wheel plane 02-06 facing toward the clutches K1, K2. A further one-sided action coupling device C is arranged on the first countershaft w_vorgelege1, on the side of the third wheel plane 03-05 facing away from the clutches K1, K2.

In the third embodiment variant, the additional shifting element G, for producing the winding gear or for coupling the two part-transmissions, is arranged on the second countershaft w_vorgelege2 between the second wheel plane 02-04 and the third wheel plane 03-05.

The table in FIG. 3A shows an example shifting scheme for the third embodiment variant of the six-gear dual-clutch transmission.

According to this, the first forward gear 1 can be engaged as a winding gear by means of the first clutch K1, the activated shifting element G and the coupling device A-B when pushed in the B direction. The second forward gear 2 is engaged by means of the second clutch K2 and the coupling device A-B pushed in the B direction. In contrast, the third forward gear 3 is engaged by means of the first clutch K1 and the coupling device E-F when pushed in the E direction, and the fourth forward gear 4 can be engaged with the second clutch K2 and the coupling device A-B when pushed in the A direction. Finally, the fifth forward gear 5 is engaged by the first clutch K1 and the coupling device E-F pushed in the F direction, whereas the sixth forward gear 6 is engaged with the second clutch K2 and the coupling device D of the second countershaft w_vorgelege2. The first reverse gear R1 is engaged by means of the first clutch K1 and the coupling device C of the first countershaft w_vorgelege1. The second reverse gear R2 is engaged as a winding gear by means of the second clutch K2, the coupling device C of the first countershaft w_vorgelege1, and the activated shifting element G.

Thus, in the first forward gear 1, the two part-transmissions with the toothed gearwheels 11, 05, 04, 10, 02 and 07 are coupled. In the second forward gear 2 the toothed gearwheels 10, 02 and 07 are used. In the third forward gear 3 the toothed gearwheels 11, 05 and 08 are used, and in the fourth forward gear 4 the gearwheels 09, 01 and 07 are used. Finally, in the fifth forward gear 5 the toothed gearwheels 12, 06 and 08, and in the sixth forward gear 6 the gearwheels 10, 04 and 08 are used. In the first reverse gear R1, the toothed gearwheels 11, 15, 03 and 07 are used. In the second reverse gear R2, the toothed gearwheels 10, 04, 05, 11, 15, 03 and 07 are used.

In this embodiment variant, however, other allocations of the individual gear steps in relation to the clutches are also possible. In particular for example, a converse allocation can be realized in the simplest manner by mirror reflection.

In the embodiment variants described above, the direction indicated in each case, in which the coupling devices have to be pushed in order to connect a desired idler gearwheel with the countershaft concerned, can be changed by modifying the coupling devices, for example with appropriate reversing elements.

INDEXES

01 Idler gearwheel of the first countershaft
02 Idler gearwheel of the first countershaft
03 Idler gearwheel of the first countershaft
04 Idler gearwheel of the second countershaft
05 Idler gearwheel of the second countershaft
06 Idler gearwheel of the second countershaft
07 Fixed gearwheel of the first countershaft as a drive output stage
08 Fixed gearwheel of the second countershaft as a drive output stage
09 Fixed gearwheel of the second transmission input shaft
10 Fixed gearwheel of the second transmission input shaft
11 Fixed gearwheel of the first transmission input shaft
12 Fixed gearwheel of the first transmission input shaft
13 Fixed gearwheel of the drive output shaft
K1 First clutch
K2 Second clutch
w_an Drive input shaft
w_ab Drive output shaft
w_vorgelege1 First countershaft
w_vorgelege2 Second countershaft
A-B Two-sided action coupling device
C One-sided action coupling device
D One-sided action coupling device
D-E Two-sided action coupling device
E-F Two-sided action coupling device
G Additional shifting element
F One-sided action coupling device
i Transmission ratio
phi Transmission spread
1 First forward gear
2 Second forward gear
3 Third forward gear
4 Fourth forward gear
5 Fifth forward gear
6 Sixth forward gear
RA1 First reverse gear
RA2 Second reverse gear
RB1 Alternative first reverse gear
R1 First reverse gear
R2 Second reverse gear
w_zw Intermediate shaft
15 Idler gearwheel on the intermediate shaft

The invention claimed is:

1. A dual-clutch transmission with first and second clutches (K1, K2) whose input sides are connected to a drive input shaft (w_an) and whose output sides are respectively connected to one of first and second transmission input shafts (w_K1, w_K2) arranged coaxially with one another,
    toothed gearwheels, designed as idler gearwheels (01, 02, 03, 04, 05, 06), being mounted to rotate on at least first and second countershafts (w_vorgelege1, w_vorgelege2),
    toothed gearwheels, designed as fixed gearwheels (09, 10, 11), being rotationally fixedly connected to the first and the second transmission input shafts (w_K1, w_K2) and at least partially engage with the idler gearwheels (01, 02, 03, 04, 05, 06),
    a plurality of coupling devices (A-B, C, D-E, D, E-F, F) for coupling an idler gearwheel (01, 02, 03, 04, 05, 06) with one of the first and the second countershafts (w_vorgelege1, w_vorgelege2),
    a first drive output gearwheel (07, 08) fixedly supported by the first countershaft (w_vorgelege1) and coupled with teeth of a drive output shaft (w_ab),
    a second drive output gearwheel (07, 08) fixedly supported by the second countershaft (w_vorgelege2) and coupled with the teeth of the drive output shaft (w_ab), and
    at least one shifting element (G) for coupling the first and the second transmission input shafts (w_K1, w_K2) with one another such that at least six shift-under-load forward gears (1, 2, 3, 4, 5, 6) and at least one reverse gear (RA1, R1) can be engaged,
    wherein the transmission has either three wheel planes (01-04; 02-05; 03-06) or four wheel planes (01-04, 01-09; 02-05, 02-04; 03-11, 03-05; 12-06) such that the shifting element (G) engages at least one shift-under-load winding gear.

2. The dual-clutch transmission according to claim 1, wherein one of the shift-under-load winding gear and a non shift-under-load winding gear is one of an overdrive, an off-road gear, an intermediate gear and an additional reverse gear.

3. The dual-clutch transmission according to claim 1, wherein at least a first forward gear (1) and at least a reverse gear (RA2, RB1, R2) is shifted as a shift-under-load winding gear.

4. The dual-clutch transmission according to claim 1, wherein the transmission has three wheel planes (01-04; 02-05; 03-06) which comprise a fixed gearwheel (11) on the first transmission input shaft (w_K1) and two fixed gearwheels (09, 10) on the second transmission input shaft (w_K2) and, in each case, three idler gearwheels (01, 02, 03) on the first countershaft (w_vorgelege1) and three idler gearwheels (04, 05, 06) on the second countershaft (w_vorgelege2).

5. The dual-clutch transmission according to claim 1, wherein in a first wheel plane (01-04), the fixed gearwheel (09) of the second transmission input shaft (w_K2) meshes with the idler gearwheel (01) of the first countershaft (w_vorgelege1) and, in addition, an idler gearwheel (15) meshes both with the fixed gearwheel (09) of the second transmission input shaft (w_K2) and with the idler gearwheel (04) of the second countershaft (w_vorgelege2).

6. The dual-clutch transmission according to claim 5, wherein the idler gearwheel (15), that meshes with the idler gearwheel (04) of the second countershaft (w_vorgelege2), is arranged on an intermediate shaft (w_zw).

7. The dual-clutch transmission according to claim 1, wherein an idler gearwheel (01) of the first countershaft (w_vorgelege1) meshes with an idler gearwheel (04) of the second countershaft (w_vorgelege2).

8. The dual-clutch transmission according to claim 5, wherein the idler gearwheel (15, 01) which meshes with the idler gearwheel (04) of the second countershaft (w_vorgelege2) is a step wheel.

9. The dual-clutch transmission according to claim 1, wherein in a second wheel plane (02-05), a fixed gearwheel (10) of the second transmission input shaft (w_K2) meshes with both an idler gearwheel (02) of the first countershaft (w_vorgelege1) and with an idler gearwheel (05) of the second countershaft (w_vorgelege2).

10. The dual-clutch transmission according to claim 1, wherein in a third wheel plane (03-06), a fixed gearwheel (11) of the first transmission input shaft (w_K1) meshes both with an idler gearwheel (03) of the first countershaft (w_vorgelege1) and with an idler gearwheel (06) of the second countershaft (w_vorgelege2).

11. The dual-clutch transmission according to claim 1, wherein a two-sided action coupling device (A-B) is arranged on the first countershaft (w_vorgelege1), between a first wheel plane (01-04) and a second wheel plane (02-05), and a two-sided action coupling device (D-E) is arranged on the second countershaft (w_vorgelege2), between the first wheel plane (01-04) and the second wheel plane (02-05).

12. The dual-clutch transmission according to claim 11, wherein, on a third wheel plane (03-06), a one-sided action coupling device (C) is arranged on the first countershaft (w_vorgelege1) and a one-sided action coupling device (F) is arranged on the second countershaft (w_vorgelege2).

13. The dual-clutch transmission according to claim 1, wherein the shifting element (G) is arranged on the second countershaft (w_vorgelege2) between a second wheel plane (02-05) and a third wheel plane (03-06).

14. The dual-clutch transmission according to claim 12, wherein the one-sided action coupling device (F) arranged on the second countershaft (w_vorgelege2) and the shifting element (G) are two-sided action coupling devices.

15. The dual-clutch transmission according to claim 12, wherein a first forward gear (1) is engaged as a winding gear by engagement of the first clutch (K1), activating the shifting element (G) and biasing the two-sided action coupling device (A-B) on the first countershaft (w_vorgelege1) in a first direction (A), the second forward gear (2) is engaged by the second clutch (K2) and the biasing two-sided action coupling device (A-B) on the first countershaft (w_vorgelege1) in the first direction (A), a third forward gear (3) is engaged by engagement of the first clutch (K1) and the engagement of the one-sided action coupling device (F) on the second countershaft (w_vorgelege2), a fourth forward gear (4) is engaged by engagement of the second clutch (K2) and by biasing the two-sided action coupling device (D-E) on the second countershaft (w_vorgelege2) in a second direction (E), a fifth forward gear (5) is engaged by engagement of the first clutch (K1) and engagement of the one-sided action coupling device (C) on the first countershaft (w_vorgelege1), a sixth forward gear (6) is engaged by engagement of the second clutch (K2) and by biasing the coupling device (A-B) on the first countershaft (w_vorgelege1) in a second direction (B), a first reverse gear (RA1) is engaged as a winding gear by engagement of the first clutch (K1), activating the shifting element (G) and biasing the second two-sided action coupling device (D-E) on the second countershaft (w_vorgelege2) in a first direction (D), and a second reverse gear or an alternative first reverse gear (RA2, RB1) is engaged by engagement of the second clutch (K2) and by biasing the two-sided action coupling device (D-E) on the second countershaft (w_vorgelege2) in the first direction (D).

16. The dual-clutch transmission according to claim 1, wherein an additional fixed gearwheel (12) is arranged on the first transmission input shaft (w_K1) to form a fourth wheel plane (12-06).

17. The dual-clutch transmission according to claim 16, wherein the transmission has four wheel planes (01-04, 02-05, 03-11, 12-06) which comprise two fixed gearwheels (09, 10; 11, 12) on the first and the second transmission input shafts (w_K1, w_K2) and, in each case, three idler gearwheels (01, 02, 03) on the first countershaft (w_vorgelege1) and three idler gearwheels (04, 05, 06) on the second countershaft (w_vorgelege2).

18. The dual-clutch transmission according to claim 16, wherein in a first wheel plane (01-04), a fixed gearwheel (09) of the second transmission input shaft (w_K2) meshes with an idler gearwheel (01) of the first countershaft (w_vorgelege1) and an idler gearwheel (15) meshes with both a fixed gearwheel (09) of the second transmission input shaft (w_K2) and with an idler gearwheel (04) of the second countershaft (w_vorgelege2).

19. The dual-clutch transmission according to claim 18, wherein the idler gearwheel, which meshes with the idler gearwheel (04) of the second countershaft (w_vorgelege2), is arranged on an intermediate shaft (w_zw).

20. The dual-clutch transmission according to claim 18, wherein an idler gearwheel (01) of the first countershaft (w_vorgelege1) meshes with an idler gearwheel (04) of the second countershaft (w_vorgelege2).

21. The dual-clutch transmission according to claim 18, wherein the idler gearwheel (15, 01), that meshes with the idler gearwheel (04) of the second countershaft (w_vorgelege2), is a step wheel.

22. The dual-clutch transmission according to claim 16, wherein in a second wheel plane (02-05), a fixed gearwheel (10) of the second transmission input shaft (w_K2) meshes with both an idler gearwheel (02) of the first countershaft (w_vorgelege1) and an idler gearwheel (05) of the second countershaft (w_vorgelege2).

23. The dual-clutch transmission according to claim 16, wherein in a third wheel plane (03-11), a fixed gearwheel (11) of the first transmission input shaft (w_K1) meshes with an idler gearwheel (03) of the first countershaft (w_vorgelege1).

24. The dual-clutch transmission according to claim 16, wherein in a fourth wheel plane (12-16), a fixed gearwheel (12) of the first transmission input shaft (w_K1) meshes with an idler gearwheel (06) of the second countershaft (w_vorgelege2).

25. The dual-clutch transmission according to claim 16, wherein a two-sided action coupling device (A-B) is arranged on the first countershaft (w_vorgelege1), between a first wheel plane (01-04) and a second wheel plane (02-05), and a two-sided action coupling device (D-E) is arranged on the second countershaft (w_vorgelege2), between the first wheel plane (01-04) and the second wheel plane (02-05).

26. The dual-clutch transmission according to claim 16, wherein a one-sided action coupling device (C) is arranged on the first countershaft (w_vorgelege1) on a third wheel plane (03-11).

27. The dual-clutch transmission according to claim 16, wherein a one-sided action coupling device (F) is arranged on the second countershaft (w_vorgelege2) on a fourth wheel plane (12-06).

28. The dual-clutch transmission according to claim 16, wherein the shifting element (G), on the first countershaft (w_vorgelege1), is arranged between a second wheel plane (02-05) and a third wheel plane (03-11).

29. The dual-clutch transmission according to claim 16, wherein the shifting element (G) and another coupling device (C), arranged on the first countershaft (w_vorgelege1), are two-sided action coupling devices.

30. The dual-clutch transmission according to claim 16, wherein a two-sided action coupling device (A-B) is arranged on the first countershaft (w_vorgelege1), between a first wheel plane (01-04) and a second wheel plane (02-05), and a two-sided action coupling device (D-E) is arranged on the second countershaft (w_vorgelege2), between the first wheel plane (01-04) and the second wheel plane (02-05), a one-sided action coupling device (C) is arranged on the first countershaft (w_vorgelege1) on a third wheel plane (03-11), and a one-sided action coupling device (F) is arranged on the second countershaft (w_vorgelege2) on a fourth wheel plane (12-06); and
  a first forward gear (1) is engaged as a winding gear by engagement of the first clutch (K1), activating the shifting element (G) and biasing the two-sided action coupling device (D-E) on the second countershaft (w_vorgelege2) in a second direction (E), a second forward gear (2) is engaged by engagement of the second clutch (K2) and biasing the two-sided action coupling device (D-E) on the second countershaft (w_vorgelege2) in the second direction (E), a third forward gear (3) is engaged by engagement of the first clutch (K1) and engagement of the coupling device (C) on the first countershaft (w_vorgelege1), a fourth forward gear (4) is engaged by engagement of the second clutch (K2) and biasing the coupling device (A-B) on the first countershaft (w_vorgelege1) in a first direction (A), a fifth forward gear (5) is engaged by engagement of the first clutch (K1) and engagement of the one-sided action coupling device (F) on the second countershaft (w_vorgelege2), a sixth forward gear (6) is engaged by engagement of the second clutch (K2) and biasing the coupling device (A-B) on the first countershaft (w_vorgelege1) in a second direction (B), a first reverse gear (R1) is engaged as a winding gear by engagement of the first clutch (K1), activating the shifting element (G) and biasing the two-sided action coupling device (D-E) on the second countershaft (w_vorgelege2) in a first direction (D), and a second reverse gear (R2) is engaged by engagement of the second clutch (K2) and biasing the two-sided action coupling device (D-E) on the second countershaft (w_vorgelege2) in the first direction (D).

31. The dual-clutch transmission according to claim 1, wherein at least a first forward gear (1) and a second reverse gear (R2) are engaged as shift-under-load winding gears.

32. The dual-clutch transmission according to claim 31, wherein the transmission has four wheel planes (01-09, 02-04, 03-05, 12-06) which comprise two fixed gearwheels (09, 10; 11, 12) on the two transmission input shafts (w_K1, w_K2) and three idler gearwheels (01, 02, 03) on the first countershaft (w_vorgelege1) and three idler gearwheels (04, 05, 06) on the second countershaft (w_vorgelege2).

33. The dual-clutch transmission according to claim 31, wherein in a first wheel plane (01-09), a fixed gearwheel (09) of the second transmission input shaft (w_K2) meshes with an idler gearwheel (01) of the first countershaft (w_vorgelege1).

34. The dual-clutch transmission according to claim 31, wherein in a second wheel plane (02-04), a fixed gearwheel (10) of the second transmission input shaft (w_K2) meshes both with an idler gearwheel (02) of the first countershaft (w_vorgelege1) and with an idler gearwheel (04) of the second countershaft (w_vorgelege2).

35. The dual-clutch transmission according to claim 31, wherein in a third wheel plane (03-05), a fixed gearwheel (11) of the first transmission input shaft (w_K1) meshes with an idler gearwheel (05) of the second countershaft (w_vorgelege2) and an idler gearwheel (15) meshes both with the fixed gearwheel (11) of the first transmission input shaft (w_K1) and with an idler gearwheel (03) of the first countershaft (w_vorgelege2).

36. The dual-clutch transmission according to claim 35, wherein the idler gearwheel (15), that meshes with the idler gearwheel (03) of the first countershaft (w_vorgelege1), is arranged on an intermediate shaft (w_zw).

37. The dual-clutch transmission according to claim 31, wherein an idler gearwheel (05) of the second countershaft (w_vorgelege2) meshes with an idler gearwheel (03) of the first countershaft (w_vorgelege1).

38. The dual-clutch transmission according to claim 35, wherein the idler gearwheel (05, 15), that meshes with the idler gearwheel (03) of the first countershaft (w_vorgelege1), is a step wheel.

39. The dual-clutch transmission according to claim 31, wherein in a fourth wheel plane (12-06), a fixed gearwheel (12) of the first transmission input shaft (w_K1) meshes with an idler gearwheel (06) of the second countershaft (w_vorgelege2).

40. The dual-clutch transmission according to claim 31, wherein a two-sided action coupling device (A-B) is arranged on the first countershaft (w_vorgelege1) between a first wheel plane (01-09) and a second wheel plane (02-04).

41. The dual-clutch transmission according to claim 31, wherein a one-sided action coupling device (C) is arranged on the first countershaft (w_vorgelege1) on a third wheel plane (03-05).

42. The dual-clutch transmission according to claim 31, wherein a one-sided action coupling device (D) is arranged on the second countershaft (w_vorgelege2) on a second wheel plane (02-04).

43. The dual-clutch transmission according to claim 31, wherein a two-sided action coupling device (E-F) is arranged on the second countershaft (w_vorgelege2) between a third wheel plane (03-05) and a fourth wheel plane (12-06).

44. The dual-clutch transmission according to claim 31, wherein the shifting element (G), on the second countershaft (w_vorgelege2), is arranged between a second wheel plane (02-04) and a third wheel plane (03-05).

45. The dual-clutch transmission according to claim 42, wherein the shifting element (G) and another coupling device (D), arranged on the second countershaft (w_vorgelege2), are two-sided action coupling devices.

46. The dual-clutch transmission according to claim 31, wherein a two-sided action coupling device (A-B) is arranged on the first countershaft (w_vorgelege1) between a first wheel plane (01-09) and a second wheel plane (02-04), a one-sided action coupling device (C) is arranged on the first countershaft (w_vorgelege1) on a third wheel plane (03-05), a one-sided action coupling device (D) is arranged on the second countershaft (w_vorgelege2) on the second wheel plane (02-04), and a two-sided action coupling device (E-F) is arranged on the second countershaft (w_vorgelege2) between a third wheel plane (03-05) and a fourth wheel plane (12-06);

a first forward gear (1) is engaged as a winding gear by engagement of the first clutch (K1), activating the shifting element (G) and biasing the two-sided action coupling device (A-B) on the first countershaft (w_vorgelege1) in a second direction (B), a second forward gear (2) is engaged by engagement of the second clutch (K2) and biasing the two-sided action coupling device (A-B) on the first countershaft (w_vorgelege1) in the second direction (B), a third forward gear (3) is engaged by engagement of the first clutch (K1) and biasing the two-sided action coupling device (E-F) on the second countershaft (w_vorgelege2) in the first direction (E), a fourth forward gear (4) is engaged by engagement of the second clutch (K2) and biasing the two-sided action coupling device (A-B) on the first countershaft (w_vorgelege1) in a first direction (A), a fifth forward gear (5) is engaged by engagement of the first clutch (K1) and biasing the two-sided action coupling device (E-F) on the second countershaft (w_vorgelege2) in a second direction (F), a sixth forward gear (6) is engaged by engagement of the second clutch (K2) and engagement of the one-sided action coupling device (D) on the second countershaft (w_vorgelege2), a first reverse gear (R1) is engaged by engagement of the first clutch (K1) and engagement of the one-sided action coupling device (C) on the first countershaft (w_vorgelege1), and a second reverse gear (R2) is engaged as a winding gear by engagement of the second clutch (K2), activating the shifting element (G) and engagement of the one-sided action coupling device (C) on the first countershaft (w_vorgelege1).

47. The dual-clutch transmission according to claim 1, wherein the drive input shaft (w_an) and the drive output shaft (w_ab) are not arranged coaxially with one another.

48. The dual-clutch transmission according to claim 1, wherein an integrated drive output stage is provided which comprises a fixed gearwheel (13) of the drive output shaft (w_ab) which meshes both with a fixed gearwheel (07) of the first countershaft (w_vorgelege1) and with a fixed gearwheel (08) of the second countershaft (w_vorgelege2).

49. The dual-clutch transmission according to claim 1, wherein lower forward gears and the reverse gears are engaged by one of the first and the second clutches (K1, K2), which is one of a starting clutch and a shifting clutch.

* * * * *